March 22, 1966 W. T. BRADER, JR 3,242,002
METHOD OF ANCHORING ORGANIC POLYMER COATING TO CELLULOSIC
MATERIAL AND COATED SHEET
Filed Feb. 19, 1962
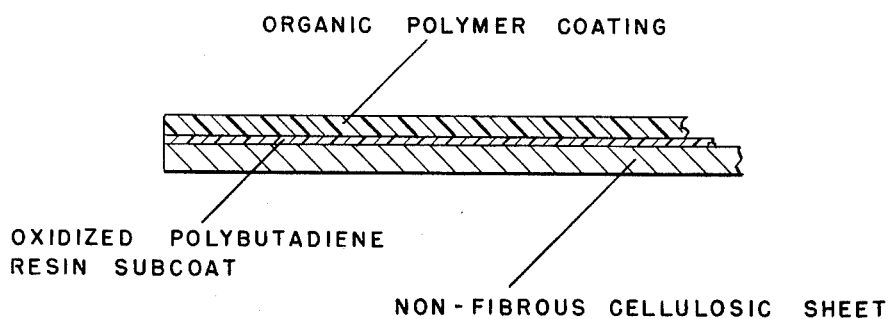

United States Patent Office 3,242,002
Patented Mar. 22, 1966

3,242,002
METHOD OF ANCHORING ORGANIC POLYMER COATING TO CELLULOSIC MATERIAL AND COATED SHEET
Wilbur T. Brader, Jr., Swarthmore, Pa., assignor, by mesne assignments, to FMC Corporation, San Jose, Calif., a corporation of Delaware
Filed Feb. 19, 1962, Ser. No. 174,294
17 Claims. (Cl. 117—76)

This invention relates to flexible composite sheets having excellent adhesion properties. More particularly it relates to the anchoring of organic polymer coatings to non-fibrous, flexible cellulosic base sheets.

The development of stronger anchoring agents for use in improving the adhesion of coatings on cellulosic films such as cellophane is commercially desirable. Long term research projects for the development of new anchoring agents have been instituted by manufacturers of cellulosic wrapping material.

It is an object of the present invention to provide a non-fibrous flexible cellulosic base sheet having an improved anchoring agent on at least one surface thereof.

It is another object of this invention to provide a composite flexible sheet of a non-fibrous cellulosic base member and an organic polymer coating having improved adhesion properties.

It is a further object of this invention to provide a method of forming a composite flexible sheet having a non-fibrous cellulosic base member including regenerated cellulose, an anchoring subcoat and an organic polymer coating including a vinylidene chloride copolymer.

These and other objects are accomplished in accordance with this invention with a non-fibrous, flexible cellulosic sheet having on at least one surface thereof a coating of less than 0.1 mil thickness of a lower aliphatic peracid oxidized polybutadiene resin having an epoxy content of at least 5% by weight. This anchored sheet is topcoated with an organic polymer coating to obtain a composite sheet having extremely strong bonds between the coating and the base sheet.

The accompanying drawing is a sectional view of the composite sheet prepared in accordance with the invention.

The invention also includes a method of forming a composite sheet which comprises applying an organic solvent solution of from about 1 to about 5% by weight of a lower aliphatic peracid oxidized polybutadiene resin having an epoxy content of at least 5% by weight to a non-fibrous, flexible cellulosic sheet, evaporating the solvent, and coating the sheet with an organic polymer. A curing agent is also advantageously incorporated in the organic solvent solution in an amount of about 7 to about 12% by weight based on the weight of the oxidized polybutadiene resin. In addition, antiblocking agents including waxes and clays or both may be incorporated in an amount of from about 0.1 to about 10% based on the weight of the oxidized polybutadiene resin.

The non-fibrous, flexible cellulosic sheets of this invention include, for example, ribbon, films and pellicles of regenerated cellulose, and cellulose derivatives including ethers and esters such as carboxymethyl cellulose, carboxyethyl cellulose, hydroxyethyl cellulose, hydroxypropyl cellulose, cellulose acetate and cellulose triacetate.

The organic polymer coatings of this invention include, for example, sarans which are defined as vinylidene chloride copolymers containing at least 50% vinylidene chloride and at least one other monomer copolymerizable therewith, for example, acrylonitrile, vinyl chloride, vinyl acetate, acrylic acid, methacrylic acid, alkyl acrylates, alkyl methacrylates, etc.; polyalkylenes including, for example, polyethylene, polypropylene, and polyisobutylene; polyesters including, for example, polyethylene terephthalate, polyethylene isophthalate, polyethylene dibenzoate, etc.; other vinyl resins including, for example, polyvinyl chloride, polyvinyl acetate, copolymers of vinyl chloride and vinyl acetate, polyvinyl alcohol; nylon; and nitrocellulose. The preferred coatings for this invention are the saran-type coatings based on their ability to provide composite sheets having excellent food wrapping characteristics.

The anchoring agent of this invention is a polybutadiene resin which has been oxidized with a lower aliphatic peracid including, for example, peracetic acid and performic acid. The oxidized polybutadiene has an epoxy content of at least 5% and preferably about 9% based on the weight of the oxidized resin. The uncured oxidized polybutadiene resin as described in U.S. Patent 2,829,135 is suitable for this invention. The anchoring agent is applied to the cellulosic base sheet as a thin subcoat of less than 0.1 mil thickness and preferably less than 0.05 mil. It is preferred that the oxidized polybutadiene resin be dissolved in an organic solvent including, for example, a lower alkyl acetate and particularly butyl acetate at a coating composition concentration of from about 1 to 5% and preferably from 2 to 3% in order to obtain subcoatings of less than about 0.05 mil.

While the oxidized polybutadiene resin can be used alone to provide anchoring for organic polymers to cellulosic base sheets, it is preferred for commercial production of the composite sheet to employ a curing agent admixed with the oxidized polybutadiene in order to obtain a subcoat having a less tacky surface. Curing agents for resins are well known chemical materials and include, for example, acids, acid anhydrides, glycols, polyphenols, and polysulfides. More particularly, saturated or unsaturated dicarboxylic acids or anhydrides, for example adipic, fumaric, maleic, oxalic, sebacic and tartaric acids, and maleic, succinic, phthalic, tetrahydrophthalic, and pyromellitic anhydrides. Mixtures and adducts of these acids and acid-anhydrides with glycols or polyglycols are also useful curing agents. The adduct of pyromellitic dianhydride and polyethylene glycol has been found to be an excellent curing agent for this invention.

In addition, maleic anhydride and resinous products of styrene and maleic anhydride have also been used as curing agents with very satisfactory results. Generally speaking the curing agent is used in an amount ranging between about 7% and 12% based on the weight of the subcoat. The upper limit of this range is dictated by the fact that incompatible coatings resulted when saran coatings were used with subcoats containing more than 12% of the pyromellitic dianhydride-polyethylene glycol adduct. The lower limit of this range was established by the need for at least 7% of the curing agent to provide a satisfactory decrease in the tackiness of the subcoat.

The subcoat composition may be further modified with the addition of an antiblocking agent including, for example, hydrocarbon waxes and synthetic waxy materials, clays and mixtures of clays and waxes in an amount ranging from about 0.1 to about 10% based on the weight of the subcoat.

The composite sheet and method of coating for this invention is demonstrated in the following example.

EXAMPLE

Samples of unanchored regenerated cellulose film of about 0.9 mil thickness were subcoated with various proportions of "Oxiron 2000," a commercially available oxidized polybutadiene, and the adduct of pyromellitic dianhydride and the polyethylene glycol. "Oxiron 2000" is a peracetic acid oxidized polybutadiene resin having a viscosity at 25° C. of 1800 poise, an epoxy content of 9% and a hydroxyl content of 2.5% based on the weight of the resin. The pyromellitic dianhydride-polyethylene glycol adduct was supplied in a methyl ethyl ketone solution at a concentration of 55%. The subcoat components were dissolved and mixed in butylacetate to obtain a subcoat concentration of less than 3%.

The film samples were dipped in the subcoat solution at 40° C., removed and permitted to cure and dry at 85° C. for 3 to 4 minutes.

The subcoated film was then topcoated with a saran lacquer comprising a coating composition of 100 parts of a copolymer of 90% by weight vinylidene chloride and 10% by weight of acrylonitrile, 2.7 parts of hydrogenated castor oil, 1.0 part of a clay and 0.25 part of a castor oil-phthalic anhydride alkyd resin, and the coating composition dissolved in 90 parts of tetrahydrofuran and 10 parts of toluene to obtain a coating concentration of about 6% by weight. In order to apply the topcoat, the subcoated film was dipped in the saran lacquer at 40° C. and then dried at 85° C. for 3 to 4 minutes.

Film samples prepared as described above were subjected to standard physical tests, the results of which are reported in the following table.

It is obvious from the foregoing table that the oxidized resin anchoring agent of this invention provides excellent adhesion of the coating to the base film. It has been found that the anchoring agent provides excellent adhesion for other organic polymer coatings to cellulosic base films including, for example, nitrocellulose to regenerated cellulose and a polyethylene terephthalate-isophthalate resin to regenerated cellulose film.

Various changes and modifications may be made in practicing the invention without departing from the spirit and scope thereof and, therefore, the invention is not to be limited except as defined in the appended claims.

I claim:

1. A non-fibrous, flexible cellulosic sheet having on at least one surface thereof a coating of less than 0.1 mil of a lower aliphatic peracid oxidized polybutadiene resin having an epoxy content of at least 5% by weight.

2. The cellulosic sheet of claim 1 wherein the oxidized polybutadiene resin is cured.

3. The cellulosic sheet of claim 2 wherein the oxidized polybutadiene resin contains an antiblocking agent.

4. A composite flexible sheet comprising a non-fibrous, flexible cellulosic base sheet having a subcoat of less than

*Table*

| Subcoat Comp. | Percentage—based on Coating | | | | | | |
|---|---|---|---|---|---|---|---|
| | 1 | 2 | 3 | 4 | 5 | 6 | 7 |
| Oxidized Resin* | 87.9 | 90.1 | 92.4 | 97.3 | 100 | (a) | (b) |
| Adduct** | 12.1 | 9.9 | 7.6 | 2.7 | 0 | | |
| Solids in lacquer | 2.3 | 2.2 | 2.2 | 2.1 | 2.0 | | |
| | Physical Tests for Topcoated Sheets | | | | | | |
| Heat Seal (gms.) Range | 490-620 | 480-610 | 560-630 | 680-860 | 500-750 | 200-230 | 350-330 |
| Heat Seal Average | 555 | 545 | 608 | 758 | 673 | 215 | 293 |
| Wet Anchorage | E | E | E | E | E | P | E |
| Coating Thickness (mil) | 0.15 | 0.15 | 0.15 | 0.19 | 0.19 | 0.14 | 0.16 |
| Boiling H₂O (sec.) Range | 80-96 | 62-94 | 80-114 | 85-105 | 119-123 | 0-39 | 16-24 |
| Boiling H₂O (sec.) Average | 89 | 72 | 96 | 98 | 121 | 19 | 21 |
| Tape Pull | E | E | E | E | E | P | E |

*"Oxiron 2000".
** Adduct of pyromellitic dianhydride and polyethylene glycol.
(a) = Unanchored regenerated cellulose base film.
(b) = Regenerated cellulose base film anchored with 0.15% melamine-formaldehyde precondensate based on film weight.
E = Excellent.
P = Poor.

In the above physical tests the Wet Anchorage test is a procedure used to determine how well the coating will remain adhered to the base film after exposure to excess moisture. In the test the sample film is immersed in water at room temperatures for 17 hours. The sample is then removed and rubbed vigorously between the fingers in an attempt to remove the coating.

The boiling water test is another method of testing the anchorage strength under severe conditions. In this test strips of the same test sample are heat sealed together to provide a two inch seal. One of the strips has had a section of coating removed therefrom and the other strip positioned so that it will pull against an exposed edge of the coating when the two strips are pulled apart. The ends of each strip are left unsealed. One of these ends is clamped at a fixed position. The other end has a hanging weight clamped thereon and the heat sealed portion is immersed in boiling water. At the time of immersion a stopwatch is started and the length of time necessary to strip the two inches of coating is recorded.

The tape pull test is another measure of adhesion strength and involves impressing a 4 inch by 1 inch cellophane adhesive tape on the coating and then tearing the tape from the coated surface. The amount of coating removed is noted and the adhesion property rated.

The heat seal test is well known in this field and, in general, involves heat sealing two strips of the same test film together and then measuring the strength necessary to pull them apart on a standard test machine.

0.1 mil thickness on at least one side thereof of a lower aliphatic peracid oxidized polybutadiene resin having an epoxy content of at least 5% by weight, and an organic polymer coating over said subcoat, said coating being joined firmly and continuously to said base sheet by anchorage to the oxidized resin subcoat.

5. The composite sheet of claim 4 wherein the cellulosic base sheet is regenerated cellulose.

6. The composite sheet of claim 4 wherein the organic polymer coating is selected from the group consisting of vinylidene chloride copolymers, polyalkylenes, polyesters and nitrocellulose.

7. The composite sheet of claim 5 wherein the organic polymer coating is a vinylidene chloride copolymer.

8. A method of forming a composite sheet which comprises applying an organic solvent solution of from about 1% to about 5% by weight of a lower aliphatic peracid oxidized polybutadiene resin having an epoxy content of at least 5% by weight to a non-fibruous, flexible cellulosic sheet, evaporating the solvent, and coating the sheet with an organic polymer.

9. A method of forming a composite sheet which comprises applying a lower alkyl acetate solution of from about 2 to 3% by weight of a peracetic acid oxidized polybutadiene resin having an epoxy content of at least 5% by weight and from about 7 to about 12% based on the weight of the polybutadiene resin of a curing agent to a non-fibrous, flexible cellulosic sheet, evaporating the solvent, and coating the sheet with an organic polymer.

10. The method of claim 9 wherein the cellulosic sheet is regenerated cellulose.

11. The method of claim 9 wherein the organic polymer coating is selected from the group consisting of vinylidene chloride copolymers, polyalkylenes, polyesters and nitrocellulose.

12. The method of claim 11 wherein the organic polymer coating is a vinylidene chloride copolymer.

13. A method of forming a composite sheet which comprises applying a butyl acetate solution of from about 2 to 3% by weight of a peracetic acid oxidized polybutadiene resin having an epoxy content of at least 5% by weight, from about 7 to about 12% based on the weight of the polybutadiene resin of a curing agent, and from about 1 to about 10% based on the weight of the polybutadiene resin of an antiblocking agent to a regenerated cellulose film, evaporating the solvent, and coating the film with a vinylidene chloride copolymer.

14. The method of claim 13 wherein the curing agent is the adduct of pyromellitic dianhydride and polyethylene glycol.

15. The method of claim 13 wherein the curing agent is maleic anhydride.

16. The method of claim 13 wherein the curing agent is a styrene-maleic anhydride resin.

17. The method of claim 13 wherein the vinylidene chloride copolymer coating is applied in an organic solvent solution and the coating solvent is evaporated.

References Cited by the Examiner

UNITED STATES PATENTS

| | | |
|---|---|---|
| 2,829,130 | 4/1958 | Greenspan et al. _____ 260—94.7 |
| 2,977,246 | 3/1961 | Fisher et al. _____ 117—145 |
| 3,073,796 | 1/1963 | Reich et al. _____ 260—94.7 |
| 3,085,901 | 4/1963 | Lindsey et al. _____ 117—76 |

FOREIGN PATENTS 714,275    8/1954    Great Britain.

WILLIAM D. MARTIN, *Primary Examiner.*

RICHARD D. NEVIUS, *Examiner.*